US008507078B2

(12) United States Patent

Gocho et al.

(10) Patent No.: US 8,507,078 B2

(45) Date of Patent: Aug. 13, 2013

(54) PAPER, PROCESS FOR PRODUCING THE SAME, AND PRINTED ARTICLE

(75) Inventors: Satoshi Gocho, Tokyo (JP); Toru Murakami, Tokyo (JP); Junko Yamada, Tokyo (JP); Shigenari Yasui, Osaka (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 12/923,536

(22) Filed: Sep. 27, 2010

(65) Prior Publication Data

US 2011/0086210 A1 Apr. 14, 2011

Related U.S. Application Data

(63) Continuation of application No. PCT/JP2009/056564, filed on Mar. 30, 2009.

(30) Foreign Application Priority Data

Mar. 28, 2008 (JP) ................................ 2008-088004
Jul. 18, 2008 (JP) ................................ 2008-187392

(51) Int. Cl.
*B32B 3/10* (2006.01)
*D21H 11/00* (2006.01)

(52) U.S. Cl.
USPC ..................... 428/211.1; 428/375; 428/537.5; 428/916; 283/94; 162/141

(58) Field of Classification Search
USPC ............ 428/211.1, 375, 537.5, 916; 283/94; 162/141
See application file for complete search history.

(56) References Cited

U.S. PATENT DOCUMENTS 5,565,276 A 10/1996 Murakami et al.
2005/0181695 A1 8/2005 Yoshimura et al.

FOREIGN PATENT DOCUMENTS

CN 1656262 A 8/2005
EP 0695830 A1 2/1996
JP 4-343766 11/1992
JP 5-98599 4/1993
JP 6-41872 2/1994
JP 7-207599 8/1995
JP 2843898 10/1998
JP 2002-302870 10/2002
WO 03/085177 A1 10/2003

OTHER PUBLICATIONS

Machine Translation of JP 05-098599.*
Machine Translation of JP 2002-302870.*
International Search Report on PCT/JP2009/056564, mailed May 26, 2009.
International Preliminary Report on Patentability mailed Nov. 18, 2010 issued in corresponding International Patent Application No. PCT/JP2009/056564.
Chinese Office Action mailed Jan. 5, 2012 issued in corresponding Chinese Patent Application No. 200980111442.0.

* cited by examiner

*Primary Examiner* — Gerard Higgins
*Assistant Examiner* — Sathavaram I Reddy

(57) ABSTRACT

Paper which exhibits more favorable forgery prevention effect is provided. Paper contains first and second surface regions opposed to each other and an intermediate region interposed between the first and second surface regions. Each of the first and second surface regions and the intermediate region contains cellulose fibers. At least the first surface region further comprises functional fibers which, upon reception of a physical stimulus, make a response different from that made by the cellulose fibers to the physical stimulus. The functional fibers contained in the first surface region are mingled with the cellulose fibers in the first surface region and are oriented in one direction which is parallel or oblique to one main surface of the paper.

7 Claims, 3 Drawing Sheets
(1 of 3 Drawing Sheet(s) Filed in Color)

PAPER, PROCESS FOR PRODUCING THE SAME, AND PRINTED ARTICLE

CROSS-REFERENCE TO RELATED APPLICATIONS

This is a Continuation Application of PCT Application No. PCT/JP2009/056564, filed Mar. 30, 2009, which was published under PCT Article 21(2) in Japanese. This application is based upon and claims the benefit of priority from prior Japanese Patent Applications No. 2008-088004, filed Mar. 28, 2008; and No. 2008-187392, filed Jul. 18, 2008, the entire contents of both of which are incorporated herein by reference.

BACKGROUND

1. Field of the Invention

The present invention relates to paper, a process for producing the same, and a printed article.

2. Description of the Related Art

It is important for documents like securities and certificates not to be easily forged. Thus, it is desirable that some kind of forgery prevention technology is applied to paper used as such documents.

As a forgery prevention technology which can be applied to paper, for example, a technology of mixing cellulose fibers such as pulp with functional fibers which do not allow color reproduction by copying is known to date. For example, in the pamphlet of International Publication No. 03/085177 is disclosed paper containing optical interference fibers that are dispersed and mixed with cellulose fibers.

However, in terms of visibility of functional fibers in such paper, there are still some improvements to be made. Specifically, the forgery prevention effect needs to be further improved.

SUMMARY

An object of the invention is to provide paper which exhibits more favorable forgery prevention effect.

According to the first aspect of the present invention, there is provided paper comprising first and second surface regions opposed to each other; and an intermediate region interposed between the first and second surface regions, wherein each of the first and second surface regions and the intermediate region comprises cellulose fibers, at least the first surface region further comprises functional fibers which, upon reception of a physical stimulus, make a response different from that made by the cellulose fibers to the physical stimulus, and the functional fibers contained in the first surface region are mingled with the cellulose fibers in the first surface region and are oriented in one direction which is parallel or oblique to one main surface of the paper.

According to the second aspect of the present invention, there is provided a printed article comprising the paper according to the first aspect and a printing layer formed on the paper.

According to the third aspect of the present invention, there is provided a method of producing paper, comprising applying a first dispersion liquid containing functional fibers which, upon reception of a physical stimulus, make a response different from that made by cellulose fibers to the physical stimulus and a first dispersion medium to a flow of a second dispersion liquid containing the cellulose fibers and a second dispersion medium, removing at least a part of the first dispersion medium and the second dispersion medium to form a fiber layer containing the functional fibers and the cellulose fibers, and drying the fiber layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages will become apparent and more readily appreciated from the following description of exemplary embodiments, taken in conjunction with the accompanying drawings of which.

DETAILED DESCRIPTION OF THE PREFERRED EMBODIMENTS

Figure 1:
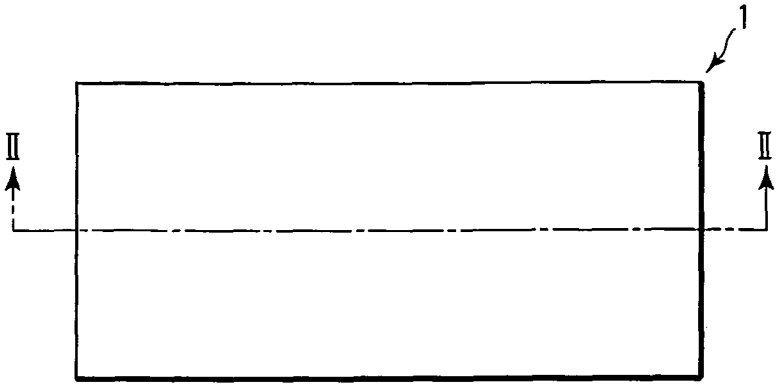
FIG. 1 is a plan view schematically showing the paper according to one embodiment of the invention.

Hereinafter, embodiments of the invention will be described in detail in view of the drawings. In the drawings, the same reference number is allotted to the constitutional elements which exhibit identical or similar function, and overlapping descriptions will not be repeated.

Figure 2:
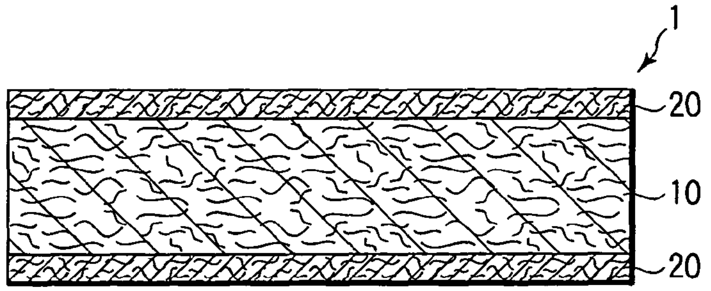
FIG. 2 is a cross-sectional view taken along line II-II of the paper shown in FIG. 1.

FIG. 1 is a plan view schematically showing the paper according to one embodiment of the invention. FIG. 2 is a cross-sectional view taken along line II-II of the paper shown in FIG. 1.

Paper 1 includes an intermediate region 10 having the form of a layer and a pair of surface regions 20 which are formed on both main surfaces of the intermediate region 10. The paper 1 contains cellulose fibers and functional fibers.

The cellulose fibers are distributed all over the intermediate region 10 and the surface regions 20. In each of the intermediate region 10 and the surface regions 20, the cellulose fibers are tangled or partially overlapped with each other. Furthermore, at the boundaries between the intermediate region 10 and the surface regions 20, the cellulose fibers that are included in the intermediate region 10 and the cellulose fibers that are included in the surface regions 20 are tangled or partially overlapped with each other. As for the cellulose fibers, pulp comprising plant fibers is typically used. Two or more kinds of synthetic fibers may also be used.

Functional fibers are fibers which, upon reception of a physical stimulus, make a response different from the response to the same physical stimulus made by the cellulose fibers. The functional fibers are, for example, the fibers showing optical response, magnetic response or electrical response that is different from those of the cellulose fibers.

The functional fibers may be distributed all over the intermediate region 10 and the surface regions 20, or may be distributed only in the surface regions 20. In the latter case, the functional fibers may be included in only one of the surface regions 20 or in both of the surface regions 20. In each region of the paper 1, the functional fibers included in the region are present as a mixture with cellulose fibers. Typically, in each region of the paper 1, the functional fibers included in the region are tangled or partially overlapped with the cellulose fibers. When the functional fibers included in the surface regions 20 are exposed on the surfaces of the paper 1 or distributed very close to the surface, they become easily visible externally.

In at least one of the surface regions 20, the functional fibers are oriented in one direction that is parallel or oblique to the main surface of the paper 1. That is, in at least one of the surface regions 20, the lengthwise directions of the functional fibers are oriented in one direction on average. Hereinafter, orthogonal projection of this direction on a plane which is parallel to the main surface of the paper 1 is referred to as the orientation main axis. Typically, many of the functional fibers are present in a direction that is substantially parallel to the main surface of the paper 1.

As the functional fibers, optical interference fibers are typically used. Alternatively, luminescent fibers containing gold, silver, copper, platinum or the like; fibers containing a special magnetic material like ferromagnetic material or the like; or fibers which exhibit absorption and/or luminescent characteristics that are different from those of cellulose fibers when irradiated with electromagnetic beam other than visible light may be used as functional fibers. Furthermore, two or more kinds of functional fibers may be used. Hereinafter, as an example, the functional fibers are assumed to be optical interference fibers.

The optical interference fibers are fibers which emit interference light upon irradiation with light. Herein, the optical interference fibers refers to fibers having the thickness in the range of 10 to 100 μm, the length in the range of 0.5 to 20 mm, and the ratio of the length to the thickness in the range of 50 to 2000. If the cross section of a fiber is not a true circle, the thickness described above is obtained as follows. The cross-sectional area S of a fiber is measured, and the radius r of a circle which has the same area as the cross-sectional area S is calculated. Then, the diameter of the circle, i.e., $d=2r$, is taken as the thickness of the fiber.

Figure 3:
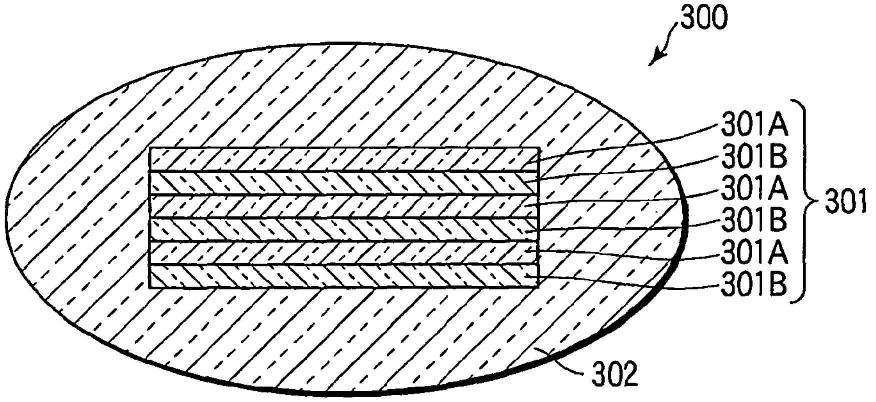
FIG. 3 is a cross-sectional view schematically showing exemplary optical interference fibers which can be used for the paper shown in FIGS. 1 and 2.

FIG. 3 is a cross-sectional view schematically showing exemplary optical interference fibers which can be used for the paper shown in FIGS. 1 and 2. In FIG. 3, the cross-section which is perpendicular to the lengthwise direction of the optical interference fibers is illustrated.

Optical interference fibers 300 include a laminated body 301 and a protective layer 302. The cross section of the optical interference fibers 300 has a flattened shape.

The laminated body 301 has a plurality of layers having different refractive indices. Specifically, the laminated body 301 is laminated in a direction which is orthogonal to the lengthwise direction of the optical interference fibers 300, and includes a plurality of layers of transparent material having different refractive indices between neighboring layers. FIG. 3 illustrates, as an example, a laminated body 301 including a plurality of layers of transparent material, in which each layer has a plate shape that is elongated in one direction and is laminated in the thickness direction so as to be parallel in the lengthwise direction, and the layers have different refractive indices between neighboring layers. Each of the layers constituting the laminated body 301 includes, for example, a transparent resin. Typically, each layer includes a polymer.

Typically, the laminated body 301 is an alternating laminated body in which a layer 301A and a layer 301B, having different refractive indices to each other, are laminated alternately. Layer 301A includes, for example, polyester. Layer 301B includes, for example, nylon.

When light beams are incident on the optical interference fibers 300, repeated reflection interference is generated in the laminated body 301. Thus, the fibers including the laminated body 301 exhibit optical interference.

At least a part of the surface of the laminated body 301, which is parallel to the lengthwise direction of the optical interference fibers 300, is coated by the protective layer 302. The protective layer 302 serves to increase the efficiency of reflecting visible light, to prevent delamination between layers in the laminated body 301, and to improve anti-abrasiveness of the optical interference fibers 300. The protective layer 302 contains a transparent resin which includes polyester, for example. The protective layer 302 may be omitted.

As described above, the cross section of the optical interference fibers 300 has a flattened shape. In addition, the main faces of layer 301A and layer 301B are parallel to the main surface of the optical interference fibers 300. In such a case, interfaces between layers 301A and layers 301B may easily become parallel to the main surface of the paper 1. For such reasons, visibility of the diffraction light that is emitted from the optical interference fibers is enhanced. Furthermore, in such a case, the area at which the optical interference fibers are in contact with the cellulose fibers is relatively increased. As a result, adhesiveness between them is improved, and therefore delamination of the optical interference fibers from the paper 1 becomes difficult to occur.

The flatness of the optical interference fibers 300, that is the ratio of the length of long axis to that of short axis in the cross section of the optical interference fibers 300, is typically in the range of 4 to 15. For example, the length of the long axis and the length of the short axis of the cross section of the optical interference fibers 300 are 70 μm and 17 μm, respectively. In such a case, particularly favorable visibility and adhesiveness can be obtained.

As optical interference fibers, fibers each having tubular shape, being arranged along the same axis, and containing a plurality of layers of transparent materials having different refractive indices between neighboring layers may be used.

The optical interference fibers may be surface-treated. That is, at least a part of the surface of the optical interference fibers may be coated or modified with a surface treatment agent.

For example, the optical interference fibers may be surface-treated by using a polyester-polyether block copolymer and/or polyether urethane. That is, at least a part of the surface of the optical interference fibers may be coated or modified with a polyester-polyether block copolymer and/or polyether urethane. Alternatively, the optical interference fibers may be surface-treated by using a polyester-polyether block copolymer and/or polyether urethane, and a cyclic amino acid and/or its derivatives. That is, at least a part of the surface of the optical interference fibers may be coated or modified with a polyester-polyether block copolymer and/or polyether urethane, and a cyclic amino acid and/or its derivatives.

As an acid component which constitutes the polyester-polyether block copolymer, for example, aromatic dicarboxylic acid such as terephthalic acid and isophthalic acid or its ester-forming derivatives may be used. The acid component may further comprise dicarboxylic acid having a metal sulfonate group such as 5-dimethylsulfoisophthalic acid sodium salt. In this case, content of the dicarboxylic acid having a metal sulfonate group is, for example, in the range of 0 to 40 mol % of the total acid components. If the content is too high, coating of the polyester-polyether block copolymer, which is coated or modified on the surface of the optical interference fibers, may be brittle.

As an alcohol component which constitutes the polyester-polyether block copolymer, for example, an aliphatic glycol such as ethylene glycol, propylene glycol, butane diol, diethylene glycol, dipropylene glycol and neopentyl glycol may be used. Alternatively, as the alcohol component, polyethylene glycol which is represented by the following Formula (1) and has the number average molecular weight, that is measured by gel permeation chromatography (GPC), in the range of 600 to 4000 may be used. Alternatively, ester-forming derivatives of the aliphatic glycol described above or polyethylene glycol may be used as the alcohol component.

$$RO-(C_2H_4O)_n-H$$

(where R represents hydrogen, an alkyl group, an aryl group or a cycloalkyl group; and n is a positive integer.)

The weight ratio of the alcohol component in the polyester-polyether block copolymer is, for example, in the range of 20 to 80% by weight, and typically, in the range of 40 to 80% by weight. Further, when the polyester-polyether block copolymer does not contain the dicarboxylic acid having a metal sulfonate group, the weight ratio of the polyethylene glycol represented by the above Formula (1) in the polyester-polyether block copolymer is, for example, 50% by weight or more. When this ratio is small, it is possible that emulsion and dispersion property of the polyester-polyether block copolymer becomes insufficient.

As the polyether urethane, for example, water-soluble and heat-responsive urethane comprising polyethylene glycol chain and a blocked isocyanate group is used. The water-soluble and heat-responsive urethane is obtained by, for example, preparing a urethane prepolymer having two or more free isocyanate groups by polyaddition between a compound having two or more active hydrogen atoms and an excess amount of polyisocyanate and blocking the free isocyanate group by using an equivalent amount or more of an aqueous sodium bisulfate solution. The weight ratio of the polyethylene glycol in the water-soluble and heat-responsive urethane is, for example, in the range of 10 to 40% by weight. If the weight ratio is less than 10% by weight, it may be difficult to let polyether urethane become water-soluble. When the weight ratio is greater than 40% by weight, the durability of polyether urethane which is coated or modified on the surface of the optical interference function fibers may be deteriorated.

As the compound having two or more active hydrogens, for example, an alkylene oxide such as ethylene oxide and propylene oxide, its random or block copolymer, a product of addition polymerization to polyhydric alcohol such as glycerin, and a polyether compound such as ring-opening polymerization product of ϵ-caprolactone may be used. Alternatively, as the compound having two or more active hydrogens, a polyester compound such as a condensate between polyhydric carboxylic acid such as succinic acid, adipic acid, phthalic acid and maleic acid anhydride or their acid anhydrides and polyhydric alcohol such as ethylene glycol, diethylene glycol, 1,4-butane diol and glycerin may be used. Alternatively, a polyether ester compound in which an alkylene glycol such as polyethylene glycol is copolymerized with a polyester compound may be used.

As the polyisocyanate, aliphatic, alicyclic or araliphatic polyisocyanate such as hexamethylene diisocyanate, xylene diisocyanate, 4,4'-dicyclohexylmethane diisocyanate and isoboron diisocyanate is used. In such a case, it becomes possible to inhibit yellowing and enhance heat stability of a blocked polymer.

As a chain extender having an active hydrogen atom, for example, glycol such as ethylene glycol and diethylene glycol, polyhydric alcohol such as glycerin and trimetilol propane, diamine such as ethylene diamine and hexamethylene diamine, aminoalcohol such as monoethanol amine and diethanol amine, thiodiglycol such as thiodiethylene glycol or water is used.

As the cyclic amino acid and/or its derivatives, for example, the compound that is represented by the following Formula (2) is used. For example, L-proline, oxyproline, 2-pyrrolidone-5-carboxylic acid (PCA) or sodium salt of 2-pyrrolidone-5-carboxylic acid (sodium PCA) is used as such compound.

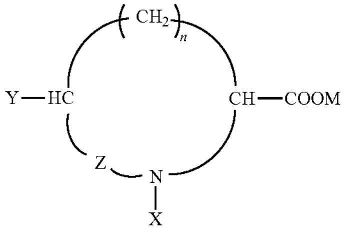

(where n is 2 or 3, X is H or $CH_2OH$, Y is H or OH, Z is $CH_2$ or C═O, and M is H, an alkali metal or amine.)

The respective amounts of polyester polyether block copolymer, polyether urethane, and cyclic amino acid and/or its derivatives used are, for example, as follows. The amount of polyester-polyether block copolymer used in terms of the solid content is, for example, 0.01 to 5% by weight, and typically in the range of 0.05 to 0.5% by weight of the optical interference fibers. The amount of polyether urethane used is in the range of 0.1 to 10% by weight in terms of the solid content, and typically in the range of 0.5 to 5% by weight of the optical interference fibers. In addition, the amount of cyclic amino acid and/or its derivatives used in terms of the solid content is, for example, in the range of 0.5 to 100% by weight, and typically in the range of 1 to 50% by weight of the optical interference fibers.

Examples of the surface treatment agent containing a polyester-polyether block copolymer, polyether urethane, and a cyclic amino acid and/or its derivatives include a reagent YM-80 (trade name) manufactured by Matsumoto Yushi-Seiyaku Co., Ltd.

When surface treatment of the optical interference fibers is performed using an aqueous solution comprising a polyester-polyether block copolymer, a catalyst may be used in order to enhance the reactivity of the polyester-polyether block copolymer. Examples of the catalyst include a compound comprising Sn such as tin (I) chloride, tin (II) chloride, tri-n-butyl tin acetate and dibutyl tin laurate. When the polyester-polyether block copolymer is used in combination with another compound, the surface treatment using another compound may be carried out after at least a part of the surface of the optical interference fibers is coated or modified in advance with the polyester-polyether block copolymer.

The surface treatment of the optical interference fibers may be performed as follows. First, an aqueous solution containing a surface treatment agent is applied on the surface of the optical interference fibers by an impregnation method, a spray method or a roller method. Then, the fibers are dried. As a result, at least a part of the surface of the optical interference fibers is coated or modified with the surface treatment agent.

The length of the optical interference fibers is, for example, in the range of 1 mm to 20 mm. If the optical interference fibers are shorter, the visibility thereof is reduced and a favorable forgery prevention effect may not be obtained. IF the optical interference fibers are longer, bending or the like of the optical interference fibers may easily occur and control of the orientation of the fibers may become difficult.

As the optical interference fibers, fibers having the interference colors of the same hue may be used alone or two or more kinds of fibers having the interference colors of different hues may be used in combination. Alternatively, the optical interference fibers having the same hue but different brightnesses may be used.

Preferably, the surface of the optical interference fibers is smooth. In such a case, diffused reflection on the surface of the optical interference fibers is less likely to occur. Thus, the visibility of diffraction light which is emitted from the optical interference fibers may be further improved.

Hereinafter, the effect exhibited by the paper 1 will be described.

As described above, the paper 1 contains optical interference fibers in at least one of the surface regions 20. As such, when the paper 1 is observed, the interference light emitted from the optical interference fibers is visible. However, color and glossiness based on the interference light cannot be reproduced by copying using a copying machine or the like. That is, even when the paper 1 is copied, the copied material does not show the same optical effect as the paper 1. Therefore, by determining the presence or absence of the optical effect, an authentic material and a copied material can be distinguished therefrom.

The inventors also found the following during the process of accomplishing the invention. It was found that optical interference fibers are more easily visible when the optical interference fibers are uniformly aligned in the lengthwise direction compared to those arranged randomly in the lengthwise direction.

It can be considered that the above phenomenon is due to the following reasons.

A part of illumination light incident on the optical interference fibers produces optical interference such as repeated reflection interference in the fibers. An observer perceives the light which produces constructive interference in the optical interference fibers, and distinguishes the optical interference fibers from the cellulose fibers based on the difference in wavelength and/or strength between the interference light above and the reflection light from the cellulose fibers.

The optical interference fibers are designed so that the light component having the angle of incidence and the wavelength within specific ranges emits much more intense interference light compared to the other light component. Thus, when the illumination direction or the observation direction is not within a predetermined range, perceiving the interference light that is specific to the optical interference fibers is impossible or difficult.

As the optical interference fibers have a long and thin shape, when white light is irradiated as illumination light from the direction which is substantially perpendicular to the lengthwise direction of the optical interference fibers, the angle of incidence of the illumination light is limited to a very narrow range. Therefore, in such a case, an observer may not perceive the interference light or may perceive only the interference light having a very narrow wavelength range. That is, in such a case, the interference light may not be perceived, or even when it is perceived, it is limited to substantially monochromatic interference light having small light intensity.

On the other hand, when illumination light is irradiated on the direction which is substantially perpendicular to the radial direction of the optical interference fibers, the illumination light enters the optical interference fibers at various angles of incidence along the lengthwise direction of the fibers. Therefore, in such a case, compared to a case in which illumination is made in the direction perpendicular to the lengthwise direction, it is more likely for an observer to perceive the interference light and the wavelength range of the perceivable interference light is broader. That is, the interference light may be perceived at high probability in this case. In addition, it is possible to determine immediately that the perceived light is interference light. Therefore, the visibility of the optical interference fibers is very high in this case.

As it is understood from the description given above, such phenomenon is particularly significant when fibrous optical interference materials whose thickness and length being largely different are used. As such, for the paper 1, it is very important to control the orientation of the optical interference fibers.

In the paper 1 according to this embodiment, the optical interference fibers are aligned in one direction that is parallel or oblique to the main surface of the paper 1 in at least one of the surface regions 20. As a result, when the paper 1 is illuminated in the direction along the plane which includes the orientation main axis described above and is perpendicular to the main surface of the paper 1, the radial direction of the optical interference fibers and the incidence direction of the illumination light become substantially perpendicular to each other at high probability. As a result, in this case, the visibility of the optical interference fibers is very high. In other words, based on the above, an authentic article and a forged article can be distinguished more easily. Furthermore, this can also improve design characteristics of the paper 1.

Standard deviation of the angles between the lengthwise directions of the optical interference fibers that are included in the surface region 20 of the paper 1 and a reference axis that is parallel to the main surface of the paper 1 is, for example, 30° or less, preferably 25° or less, more preferably 20° or less, and still more preferably 15° or less. The standard deviation may be 0°, but it is, for example, 1° or more, preferably 3° or more, and more preferably 5° or more. When the standard deviation is too high, heterogeneity in the orientation of the optical interference fibers becomes high, and therefore the visibility thereof may not be improved. On the other hand, when the standard deviation is too small, the angle range where the interference light emitted from the optical interference fibers is perceived may be narrower. As the reference axis, for example, the orientation main axis described above can be employed.

As described above, the optical interference fibers are mingled with the cellulose fibers in at least one of the surface regions 20 of the paper 1. That is, the optical interference fibers are overlapped with the cellulose fibers. Therefore, the optical interference fibers are less likely to be lost compared to a case in which a dispersion liquid prepared by dispersing the optical interference fibers in a dispersion medium is coated on regular paper. For such reasons, even when the paper 1 is used for a long period of time, the paper 1 can maintain an excellent forgery prevention effect.

In order to inhibit the loss of the optical interference fibers, it may also be considered to have fluffs on the surface of the fibers. However, in such a case, diffuse reflection may easily occur on the surface of the fibers, and as a result, the visibility of the interference light which is emitted from the optical interference fibers will be reduced. Furthermore, it may also be considered to have the optical interference fibers crinkled like wool. However, in such a case, as the light interference surface of the optical interference fibers is not even and uniform resulting in significant reduction in the visibility of the interference light.

The optical interference fibers are typically designed to be perceived on at least one of the surface regions 20 at a ratio of 30/(10 cm×10 cm) to 500/(10 cm×10 cm) fibers relative to the surface area of the surface region 20. If this ratio is smaller, perception of the interference light emitted from the optical interference fibers may become difficult. On the other hand, if this ratio is larger, it may become difficult to use the paper 1 as a printing paper or the like. Furthermore, since an excessive amount of the optical interference fibers is visible, the paper may appear to be strange.

The paper 1 may further contain fibers which emit fluorescence under ultraviolet irradiation. Alternatively, instead of the optical interference fibers described above, the paper 1 may contain optical interference fibers which emit fluorescence under ultraviolet irradiation. As the optical interference fibers which emit fluorescence under ultraviolet irradiation, for example, optical interference fibers which do not emit fluorescence under ultraviolet irradiation but are coated with a fluorescent coating may be used.

The paper 1 may contain optical interference fibers which do not emit fluorescence under ultraviolet irradiation and optical interference fibers which emit fluorescence under ultraviolet irradiation. These fibers are not distinguished from each other under illumination of normal light other than ultraviolet light. However, when the paper 1 is observed under ultraviolet irradiation, only a part of the optical interference fibers emit fluorescence. Thus, under irradiation with ultraviolet light, these fibers can be distinguished from each other.

When optical interference fibers which do not emit fluorescence under ultraviolet irradiation are used in combination with optical interference fibers which emit fluorescence under ultraviolet irradiation, the ratio between the numbers thereof is, for example, in the range of 10:1 to 10:5. If the ratio of the optical interference fibers which emit fluorescence under ultraviolet irradiation is smaller, it is possible that the function of enhancing a forgery prevention effect is insufficient. On the other hand, if the ratio of the optical interference fibers which emit fluorescence under ultraviolet irradiation is larger, the cost for producing the paper 1 may become high.

Hereinafter, an exemplary method of applying a fluorescent paint on optical interference fibers will be given.

First, a fluorescent paint (for example, trade name: Mika White KTS Extra Cone, manufactured by Nippon Kayaku Co., Ltd.) in the amount of 2% owf (weight of dye on weight of fiber) is added together with optical interference fibers to a 40° C. water bath to which 0.2 g/L of acetic acid has been added. Thereafter, the temperature is increased at a rate of 2.2° C. per minute and kept at 100° C. for 30 minutes. Thereafter, the temperature is lowered at a rate of 3.3° C. per minute. As a result, optical interference fibers which emit fluorescence are obtained.

The paper 1 may further contain binder fibers. The binder fibers serve to inhibit loss of the optical interference fibers from the paper 1. Examples of the binder fibers which may be used include ethylene vinyl alcohol copolymer fibers, core-sheath binder fibers, and slit binder fibers. Examples of the core-sheath binder fibers which may be used include fibers in which a core part comprises polypropylene and the sheath part comprises ethylene vinyl alcohol copolymer. Examples of the slit binder fibers which may be used include fibers having a structure in which one of ethylene vinyl alcohol copolymer and polyolefin polymer is supported by the other.

The surface region 20 of the paper 1 may be subjected to surface smoothing treatment. In such a case, the smoothness of the paper 1 is adjusted to be 5 seconds or more. In this manner, the light interference surface of the optical interference fibers is easily distributed on the surface region 20 without bending. Thus, the visibility of the interference light which is emitted from the optical interference fibers is improved. The smoothness described above is a value measured according to Japanese Industrial Standard JIS P8119: 1998 (IS05627: 1995), "Paper and Board—Method of testing smoothness by using Bekk smoothness tester."

The paper 1 is produced, for example, in the following manner.

First, a dispersion liquid including cellulose fibers and a dispersion medium is prepared.

The dispersion liquid contains pulp made of cellulose fibers as a main component. Examples of the pulp which may be used include a wood pulp such as needle bleached kraft pulp (NBKP), leaf bleached kraft pulp (LBKP), needle bleached sulfite pulp (NBSP), thermomechanical pulp (TMP) and a mixture thereof, non-wood pulp such as cotton pulp, hemp pulp, straw pulp and a mixture thereof, and a mixture of these wood pulps and non-wood pulps. The dispersion liquid may further contain a subsidiary material for producing paper such as a filler, a sizing agent, a dry paper strength additive, a wet paper strength additive, a fixative, a yield improving agent, a drainage improving agent and an anti-foaming agent.

Further, the dispersion liquid is typically beaten to have freeness of 550 to 250 ml C.S.F. In such a case, cellulose fibers contained in the dispersion liquid may easily tangle with the functional fibers which are added later. As a result, the functional fibers will not be easily lost from the paper 1. The freeness described above is a value measured according to the Canadian Standard Freeness Test Method as stipulated in Japanese Industrial Standard JIS P8121: 1995, "Pulp Freeness Test Method."

Next, onto the flow of a paper layer constituting the dispersion liquid above, dispersion liquid containing the functional fibers and the dispersion medium is applied. At this time, by adjusting a flow rate of the paper layer, a moisture content in the paper layer, a concentration of the functional fibers in the dispersion liquid, an exit area of a nozzle, a supply amount of the dispersion liquid and the like, the orientation of the functional fibers in the surface region 20 of the paper 1 may be controlled. The dispersion liquid containing the functional fibers and the dispersion medium may further contain other components such as cellulose fibers. Furthermore, it should be noted that the flow of the dispersion liquid including the functional fibers and the dispersion medium be a continuous flow while avoiding a turbulent flow.

The paper layer may have a monolayer structure or a multilayer structure. However, when the paper layer has a multilayer structure and the functional fibers are mixed only in the paper layer present on the surface, the functional fibers can be effectively used, and therefore it is advantageous from the economic point of view. A preferred method of producing the multilayer structure is a method using a multi-bath cylinder paper machine.

Subsequently, the structure obtained is dried using a cylinder dryer, a Yankee dryer or the like. Thereafter, if necessary, a surface smoothing treatment such as machine calendaring and super calendaring is carried out.

The paper 1 is thus obtained.

When optical interference fibers are used as the functional fibers, the surface treatment of the optical interference fibers may precede the preparation of a dispersion liquid by mixing the optical interference fibers and the liquid medium. In this way, overlapping of the optical interference fibers to each other will not easily occur during the manufacturing process of the paper 1. As a result, each of the optical interference fibers may easily get separated and dispersed independently so that the visibility of the optical interference fibers in the paper 1 is improved. Furthermore, when the surface-treated optical interference fibers are used, adhesiveness between the optical interference fibers and the cellulose fibers is enhanced. As a result, the optical interference fibers are less likely to be lost from paper 1. In other words, the durability of the paper 1 against mechanical load is enhanced.

Figure 4:
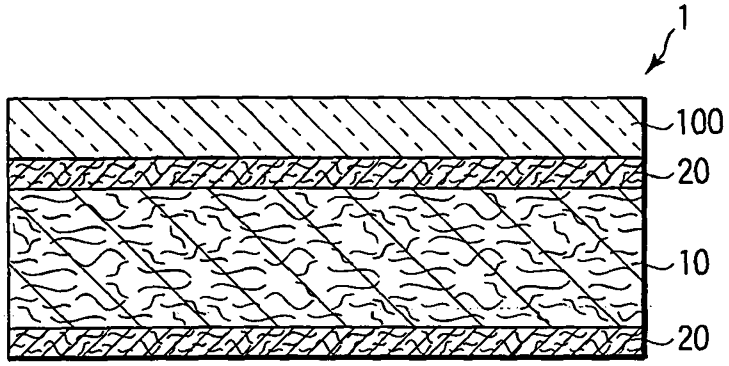
FIG. 4 is a cross-sectional view schematically showing a modified example of the paper of FIGS. 1 and 2.

FIG. 4 is a cross-sectional view schematically showing a modified example of the paper of FIGS. 1 and 2.

Paper 1 shown in FIG. 4 has the same constitution as the paper 1 which has been described with reference to FIGS. 1 and 2 except that a resin layer 100 which is coated on at least one of surface regions 20 of the paper 1 is further included. Typically, the resin layer 100 is coated on the surface region 20 including the functional fibers.

The resin layer 100 serves to inhibit loss of the functional fibers that are included in the surface region 20. Furthermore, the resin layer 100 also serves to improve flatness of the paper 1 to facilitate the formation of a printed layer and the like, which will be described later.

According to this embodiment, the functional fibers are oriented in one direction that is parallel or oblique to the main surface of the paper 1 in at least one of the surface regions 20. In such a case, compared to the case in which the functional fibers are not oriented in one direction, tangling of the cellulose fibers with the functional fibers occurs less easily. Therefore, by forming the resin layer 100, the paper 1 in which loss of the fibers is more inhibited and the forgery prevention effect is maintained for a long period of time can be obtained.

As the material of the resin layer 100, a transparent resin is typically used. As a material of the resin layer, resins such as a polyester resin, a polyurethane resin, an acrylic acid ester resin, an acrylic acid ester copolymer resin like styrene-acrylic acid ester copolymer resin, a vinyl acetate resin, a polyacrylamide resin, a melamine resin, a urea resin, polyvinyl alcohol and its derivatives, starch and its derivatives, cellulose derivatives, and casein may be used.

The resin layer 100 may be formed by using a coating machine such as a Gravure coater, a roll coater, an air knife coater, a blade coater, and a bar coater.

The coating amount of the resin layer is, for example, in the range of 0.1 to 3.0 $g/m^2$ in terms of dry weight. If the coating amount is smaller, it is difficult to obtain the effect of inhibiting the loss of functional fibers. When the amount is larger, the glossiness of the paper surface can be increased and there may be a case in which the interference color of the functional fibers is not easily perceived. There may also be a case in which the paper 1 cannot be readily used as paper for printing or the like.

Next, other technologies will be described.

In addition to those described above, as a technology for preventing forgery which can be used for paper, a technology of mixing cellulose fibers such as pulp with functional fibers which do not allow color reproduction by copying is known to date. For example, Japanese Patent No. 2843898 discloses a mixed colored-fiber paper for preventing copying which is obtained by mixing common materials for producing paper and colored-fibers having medium color.

However, the mixed paper containing functional fibers such as colored fibers is expensive in that relatively a large amount of functional fibers is used. The technology described hereinafter provides paper which achieves a sufficient forgery prevention effect even with a smaller amount of functional fibers used.

The paper according to this technology is paper which includes cellulose fibers and functional fibers which, upon reception of a physical stimulus, show a response different from the response made by the cellulose fibers to the physical stimulus. The cellulose fibers are distributed all over the paper. On the other hand, the functional fibers are distributed in one or both of surface regions or only in a part of the surface regions, and mingled with the cellulose fibers therein.

In this paper, the functional fibers are, for example, distributed only in a part of at least one of the surface regions. Alternatively, the functional fibers may be distributed in the entire area of at least one of the surface regions.

The paper according to this technology is produced, for example, according to the following method. First of all, a multilayer structure is formed. This multilayer structure has a laminated body of a non-dried first fiber layer which is formed by dipping a first paper material from a dispersion liquid containing a first paper material including cellulose fibers and functional fibers which, upon reception of a physical stimulus, show a response different from the response made by the cellulose fibers to the physical stimulus and a first dispersion medium, and a non-dried second fiber layer which is formed by dipping a second paper material from a dispersion liquid containing a second paper material including cellulose fibers but no functional fibers and a second dispersion medium. In the multilayer structure, the surface of the first fiber layer constitutes at least a part of one of the outermost surfaces. Subsequently, the multilayer structure is subjected to a drying treatment.

According to this technology, the functional fibers are distributed only in the surface region. As such, even with a smaller amount of functional fibers used, the paper exhibits the same forgery prevention effect as the paper in which the functional fibers are distributed all over the paper. Thus, by using this paper, a sufficient forgery prevention effect can be achieved with a relatively low cost.

In this paper, the functional fibers are mingled with the cellulose fibers in each surface region. Typically, the functional fibers are tangled with the cellulose fibers in the surface region. Thus, for example, compared to a case in which a dispersion liquid obtained by dispersing functional fibers in a dispersion medium is coated on regular paper, the functional fibers are less likely to be lost. For such reasons, even when used for a long period of time, the paper can maintain an excellent forgery prevention effect.

Furthermore, for example, when a dispersion liquid obtained by dispersing functional fibers in a dispersion medium is coated on regular paper, convex and concave portions may be easily produced on the paper surface according to the shape of the functional fibers. On the other hand, according to the paper of the technology of the invention, such convex and concave portions are less likely to be formed because the functional fibers are mingled with cellulose fibers. Therefore, compared to a case in which a dispersion liquid obtained by dispersing functional fibers in a dispersion medium is coated on regular paper, this paper has more favorable flatness. As such, the paper is also suitable as printing paper, writing paper and the like.

The paper according to this technology is produced, for example, in the following manner.

First of all, a plurality of baths containing the dispersion liquid having the paper materials as described in Table 1 are prepared (n is a natural number of 3 or more). Among them, the paper materials contained in the 1st bath and the $n^{th}$ bath are used as a raw material for forming a surface region, and the paper materials contained in the $2^{nd}$ bath to the $(n-1)^{th}$ bath are used as a raw material for forming an intermediate region.

TABLE 1

| Bath | Paper materials contained |
|---|---|
| $1^{st}$ bath | Cellulose fibers and functional fibers |
| $2^{nd}$ bath to $(n-1)^{th}$ bath | Cellulose fibers |
| $n^{th}$ bath | Cellulose fibers and functional fibers |

Next, by using these baths, papermaking is performed with a multi-bath cylinder paper machine. Specifically, a multilayer structure is formed by laminating the non-dried 1st fiber layer to $n^{th}$ fiber layer that are prepared by dipping the paper materials contained in each of the 1st bath to the $n^{th}$ bath, and then the structure is subjected to a drying treatment. As a result, the paper described in the above is obtained.

In this case, by adjusting the concentration of the fibers included in each bath, the thickness of the intermediate region and the surface regions may be controlled. Furthermore, by varying the number of baths which do not contain the functional fibers, the ratio R of the thickness of the surface regions to the thickness of the intermediate region may be controlled. A surface region may be formed by using a plurality of baths in which each dispersion liquid contains the functional fibers.

Various modifications can be made with this paper. For example, the paper may have a constitution in which only one of the surface regions contains the functional fibers while the other does not contain them. In such a case, either one of the 1st bath and the $n^{th}$ bath is not used in papermaking.

Figure 5:
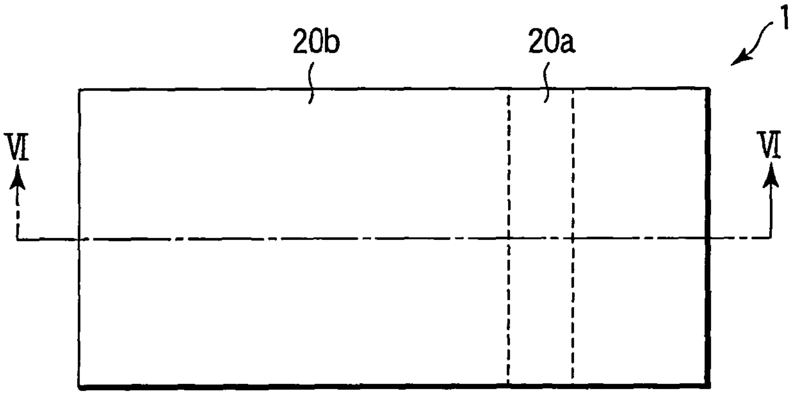
FIG. 5 is a plan view showing an exemplary paper according to another technology.
Figure 6:
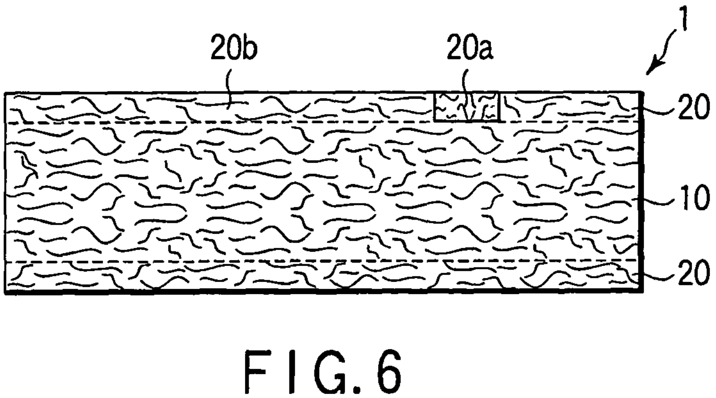
FIG. 6 is a cross-sectional view taken along line VI-VI of the paper shown in FIG. 5.

FIG. 5 is a plan view showing an exemplary paper according to another technology. FIG. 6 is a cross-sectional view taken along line VI-VI of the paper shown in FIG. 5.

In paper 1 shown in FIGS. 5 and 6, functional fibers are distributed only in a part of one of surface regions 20. Specifically, in this paper 1, one of the surface regions 20 does not contain functional fibers. In addition, in the other surface region 20, a stripe-patterned part 20*a* contains functional fibers while the other part 20*b* does not contain them.

This paper 1 is produced, for example, in the following manner.

First of all, on an wire netting, a first fiber layer containing paper materials containing cellulose fibers but not containing functional fibers is formed by using a fourdrinier machine or the like. Next, a dispersion liquid of paper materials containing the cellulose fibers and the functional fibers is introduced on any portions of the fiber layer that is supported on an wire netting, using a tub or the like to form a second fiber layer. Subsequently, a multilayer structure obtained by laminating the first fiber layer and the second fiber layer is dried to obtain the paper 1 in which the functional fibers are included in any portions in the surface region 20.

Although FIGS. 5 and 6 illustrate a case in which there is only one part 20*a* containing the functional fibers in the surface region 20, the surface region 20 may include a plurality of parts 20*a* containing the functional fibers. In addition, although FIG. 6 illustrates a case in which the part 20*a* including the functional fibers is formed in only one of the surface regions 20, this part 20*a* may be formed in both of the surface regions 20.

This technology may be used in combination with the technologies that are described before with reference to FIGS. 1 to 4. Specifically, a constitution of the paper 1 which is explained above with reference to FIGS. 1 to 4, in which only at least one of the surface regions 20 among the intermediate region 10 and the surface regions 20 containing the functional fibers, may be adopted. By adopting this constitution, excellent visibility of the functional fibers may be obtained even with a small amount of functional fibers used.

Another means for forgery prevention may be additionally used for paper 1. For example, water marking, mixing with dyed fibers, mixing with a thin strip, or an introduction of thread may be further performed. In this way, the forgery prevention effect of paper 1 may be further enhanced.

Paper 1 may be prepared as coating paper having a coating layer formed on a surface region thereof. As a material for the coating layer, a material having no adverse effect on detection of response that is exhibited by the functional fibers in the surface region is used. By forming the coating layer, durability and flatness of the paper may be further enhanced.

A printing layer may be formed on top of paper 1. In this way, a printed article having an excellent forgery prevention effect is obtained.

Paper 1 may be used for the purpose other than forgery prevention. For example, paper 1 may be used as a wrapping paper having favorable aesthetic appearance.

Hereinafter, specific examples of the paper which has been described with reference to FIGS. 1 to 4 will be described. Parts by weight, grammage, and coating amount are values that are calculated in terms of dry weight.

Example 1

Production of Paper P1

First of all, 30 parts by weight of needle bleached kraft pulp (NBKP), 70 parts by weight of leaf bleached kraft pulp (LBKP), and 6500 parts by weight of water were mixed and beaten using a beater until the freeness reaches 360 ml C.S.F. Next, 15 parts by weight of kaolin, 0.5 parts by weight of paper strength additive (trade name: Polystron, manufactured by Arakawa Chemical Industries, Ltd.), 1.0 part by weight of a sizing agent (trade name: Sizepine E, manufactured by Arakawa Chemical Industries, Ltd.) and an appropriate amount of sulfate band were added thereto to prepare paper materials.

Next, a dispersion liquid in which 1 part by weight of optical interference fibers (trade name: Morphotex, manufactured by Teijin Fibers Limited, 8 mm length and 10 dtex fineness) is dispersed in 10,000 parts by weight of water in which an appropriate amount of polyethylene glycol is dissolved was prepared. Then, by using a three-bath cylinder paper machine having a forward-flow papermaking bath, the dispersion liquid was introduced only to the paper materials which constitute a front surface layer and a back surface layer when paper having a total grammage of 100 gsm (front surface layer 25 gsm, inner layer 50 gsm and back surface layer 25 gsm) was prepared at the papermaking rate of 10 m/minute. As a result, a paper layer was obtained.

After that, by using a size-pressing machine, 5% aqueous solution of polyvinyl alcohol (trade name: Kuraray PVA117, manufactured Kuraray Co., Ltd.) was applied, and then dried.

In this manner, paper having a grammage of 100 gsm was obtained. Hereinafter, this paper is referred to as "paper P1."

The ratio of the optical interference fibers which are visible in the surface region 20 of paper P1 was 500 fibers/(10 cm×10 cm) based on the surface area of the surface region 20. The standard deviation of the angles between the lengthwise directions of the optical interference fibers that are included in the surface region 20 and can provide an observable interference color as exposed on the surface of the paper and the reference axis which is parallel to the main surface of the paper was 25°.

Example 2 to Example 10

Production of Papers P2 to P10

Papers P2 to P10 were produced in the same manner as that described for paper P1 except that the papermaking speed, the concentration of paper materials that are introduced to a bath, the speed of introducing paper materials to a cylinder and the introduction amount of optical interference fibers are changed. The details are given in Table 2.

TABLE 2

| | | Standard deviation | Number of optical interference fibers | Score |
|---|---|---|---|---|
| Example 1 | Paper P1 | 25° | 500 | 3 |
| Example 2 | Paper P2 | 23° | 30 | 3 |
| Example 3 | Paper P3 | 20° | 415 | 4 |
| Example 4 | Paper P4 | 18° | 135 | 4 |
| Example 5 | Paper P5 | 15° | 150 | 5 |
| Example 6 | Paper P6 | 15° | 30 | 5 |
| Example 7 | Paper P7 | 23° | 23 | 2 |
| Example 8 | Paper P8 | 31° | 30 | 2 |
| Example 9 | Paper P9 | 34° | 50 | 1 |
| Example 10 | Paper P10 | 37° | 500 | 2 |

In Table 2, the standard deviation is a value obtained by measuring angles between the lengthwise directions of the optical interference fibers that are included in a surface region and can provide an observable interference color as exposed on the surface of paper and the reference axis which is parallel to the main surface of the paper, and calculating the standard deviation of the angles; the number of optical interference fibers is the number of the perceivable optical interference fibers which are included in 10 cm×10 cm area of a surface region in paper; and the score is a value which represents the visibility of the optical interference fibers according to a 5-point evaluation scale as will be described below.

<Visibility>

With five test subjects, sensory test regarding the visibility of interference light that is emitted from optical interference fibers was carried out using papers P1 to P10. Specifically, papers P1 to P10 were observed by the test subjects with the naked eye under a fluorescent light conforming to the ISO/CIE10526 standard for a commercial light source. Then, the visibility recognized by the test subjects was evaluated according to a 5-point scale as follows:

5: Level at which interference light is strongly perceived

4: Level at which interference light is perceived less strongly than for 5 points 3: Level at which interference light is perceived less strongly than for 4 points 2: Level at which interference light is perceived less strongly than for 3 points 1: Level at which interference light is perceived less strongly than for 2 points The results are shown in Table 2. In Table 2, the rounded average scores of the test subjects are shown. In terms of practical use, the score is preferably 3 points or more.

As shown in Table 2, the visibility of the interference light which is emitted from the optical interference fibers was high in papers P1 to P6. In other words, an excellent forgery prevention effect was achieved. In particular, in papers P5 and P6, the visibility of the interference light was significantly high. In other words, a particularly excellent forgery prevention effect was achieved.

Further, specific examples of the paper according to the other technologies described above will be given below. Parts by weight, grammage, and coating amount are values that are calculated in terms of dry weight.

Example 12

Production of Paper P12

First of all, each of the baths having the constitution shown in Table 3 below was prepared. Herein, the terms "composition 1" and "composition 2" in Table 3 below refers to compositions shown in Tables 4 and 5 below, respectively.

Next, by using these baths, papermaking was carried out with a multi-bath cylinder papermaking machine. Specifically, a multilayer structure is formed by laminating a non-dried first fiber layer to fourth fiber layer that are prepared by dipping paper materials contained in each of the first bath to the fourth bath, and then the structure is subjected to a drying treatment. The grammages of the paper layers which are formed by the paper materials of the respective baths were set to have the values shown in Table 3. In this manner, paper which comprises pure gold thread only on the surface region was obtained. Hereinafter, this paper is referred to as "paper P12."

TABLE 3

| Bath | Composition | Grammage (g/m$^2$) |
|---|---|---|
| First bath | Composition 1 | 15 |
| Second bath | Composition 2 | 37 |
| Third bath | Composition 2 | 37 |
| Fourth bath | Composition 1 | 15 |

TABLE 4

(composition 1)

| Components | Content (parts by weight) |
|---|---|
| Needle bleached kraft pulp (NBKP) | 20 |
| Leaf bleached kraft pulp (LBKP) | 78 |
| Pure gold thread, 6 mm cut | 2 |
| White clay | 10 |
| Paper strength additive (trade name: Polystron 191, manufactured by Arakawa Chemical Industries, Ltd.) | 0.3 |
| Sizing agent (trade name: Sizepine E, manufactured by Arakawa Chemical Industries, Ltd.) | 1 |

TABLE 5

| (composition 2) | |
|---|---|
| Components | Content (parts by weight) |
| Needle bleached kraft pulp (NBKP) | 20 |
| Leaf bleached kraft pulp (LBKP) | 80 |
| White clay | 10 |
| Paper strength additive (trade name: Polystron 191, manufactured by Arakawa Chemical Industries, Ltd.) | 0.3 |
| Sizing agent (trade name: Sizepine E, manufactured by Arakawa Chemical Industries, Ltd.) | 1 |

Example 13

Comparative Example

Using a fourdrinier paper machine, paper having a grammage of 104 g/m$^2$ was produced from the raw materials having the composition as shown in Table 4 above. After that, an ink having composition 3 shown in Table 6 below was coated on the paper obtained as described above by using a spacer having a thickness of 10 μm. Hereinafter, the paper thus obtained is referred to as "paper P13."

TABLE 6

| (composition 3) | |
|---|---|
| Components | Content (parts by weight) |
| Pure gold thread, 6 mm cut | 5 |
| Adhesive (trade name: Hydran AP40, manufactured by DIC Corporation) | 80 |
| Dilution agent (water) | 10 |

Comparison of Papers P12 and P13

Magnified observation was carried out for each of papers P12 and P13. The results are shown in FIGS. 7 and 8, respectively.

Figure 7:
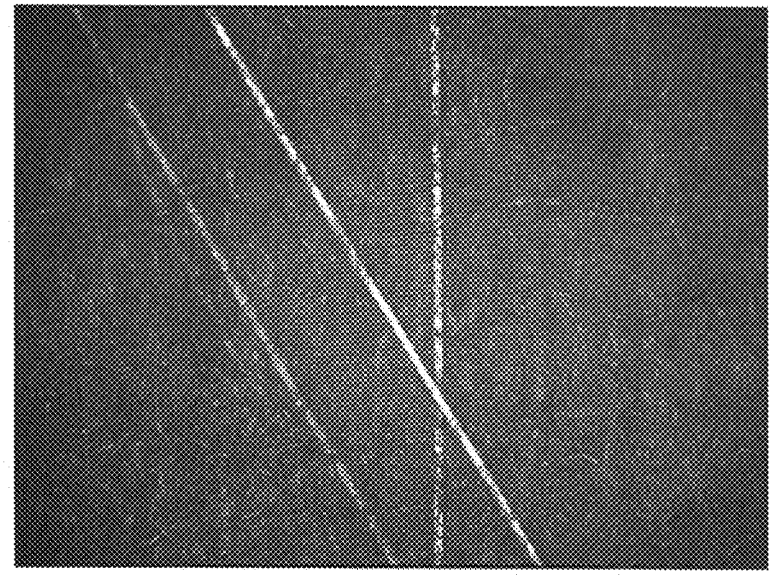
FIG. 7 is a photomicrograph showing the surface of the paper according to Example 12.
Figure 8:
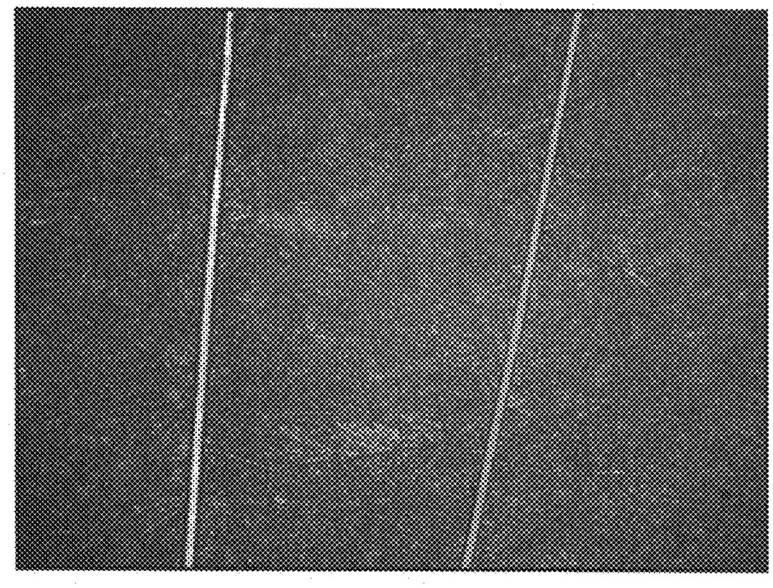
FIG. 8 is a photomicrograph showing the surface of the paper according to Example 13.

FIG. 7 is a photomicrograph showing the surface of the paper according to Example 12. FIG. 8 is a photomicrograph showing the surface of the paper according to Example 13.

As shown in FIG. 7, the pulps were tangled with the pure gold thread in paper P12. On the other hand, as shown in FIG. 8, the pulps were not tangled with the pure gold thread in paper P13 and the pure gold thread was just attached on the pulp layer.

With an adhesive tape, the likelihood of losing the pure gold thread was examined for each of papers P12 and P13. As a result, it was found that almost no loss was observed in paper P12 while a great loss was observed in paper P13.

Further advantages and modifications would be apparent to those skilled in the art. Therefore, in a broader sense, the invention is not limited to the specific descriptions or representative embodiments that are described herein. Thus, within the range which does not depart from the meanings and scope of the general concept of the invention that is defined by the appended claims and their equivalents, various modifications can be made.

What is claimed is:

1. A paper comprising a fiber layer having a first main surface and a second main surfaces wherein the second main surface is opposite to the first main surface, the fiber layer comprising:

cellulose fibers distributed throughout the fiber layer; and functional fibers mingled with the cellulose fibers and distributed in at least a surface region of the fiber layer, wherein the functional fibers are optical interference fibers, and the functional fibers distributed in the surface region are oriented such that a standard deviation of angles between lengthwise directions of the functional fibers distributed in the surface region and a reference axis is within a range of 1° to 25°, the reference axis being parallel to the first main surface.

2. The paper according to claim 1, wherein the optical interference fibers comprise a laminated body having layers with different refractive indices.

3. The paper according to claim 2, wherein the optical interference fibers further comprise a protective layer which is coated on at least a part of a surface of the laminated body parallel to a lengthwise direction of the optical interference fibers.

4. The paper according to claim 1, wherein at least a part of a surface of the optical interference fibers is coated or modified with a polyester-polyether block copolymer and/or polyether urethane.

5. The paper according to claim 1, wherein at least a part of a surface of the optical interference fibers is coated or modified with at least one of a polyester-polyether block copolymer or polyether urethane and with at least one of a cyclic amino acid or its derivatives.

6. The paper according to claim 1, wherein only the surface region contains the functional fibers.

7. A printed article comprising the paper according to claim 1 and a printing layer formed on the paper.

* * * * *